US012005784B2

(12) United States Patent
Li et al.

(10) Patent No.: US 12,005,784 B2
(45) Date of Patent: Jun. 11, 2024

(54) ELECTRIC WHEEL ASSEMBLY APPLICABLE FOR PARALLELLY MOUNTED DUAL-TIRE WHEEL, AXLE, AND VEHICLE

(71) Applicant: TSINGHUA UNIVERSITY, Beijing (CN)

(72) Inventors: Jian-Qiu Li, Beijing (CN); Jia-Yi Hu, Shenzhen (CN); Bing-Kun Cai, Beijing (CN); Hang Li, Beijing (CN); Liang-Fei Xu, Beijing (CN); Ming-Gao Ouyang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 688 days.

(21) Appl. No.: 17/221,830

(22) Filed: Apr. 4, 2021

(65) Prior Publication Data

US 2021/0221218 A1 Jul. 22, 2021

Related U.S. Application Data

(63) Continuation of application No. PCT/CN2018/116578, filed on Nov. 21, 2018.

(30) Foreign Application Priority Data

Oct. 9, 2018 (CN) .......................... 201811171038.X

(51) Int. Cl.
*B60B 11/06* (2006.01)
*B60B 1/06* (2006.01)
(Continued)

(52) U.S. Cl.
CPC .............. *B60K 7/0007* (2013.01); *B60B 1/06* (2013.01); *B60B 11/06* (2013.01); *B60B 35/163* (2013.01);
(Continued)

(58) Field of Classification Search
CPC ...... F16H 1/23; F16H 57/046; F16H 57/0471; F16H 57/0486; B60K 6/365;
(Continued)

(56) References Cited

U.S. PATENT DOCUMENTS 3,770,074 A * 11/1973 Sherman ............... B60L 3/0061
180/370
3,974,895 A 8/1976 Murphy
(Continued)

FOREIGN PATENT DOCUMENTS

CN   102673380   9/2012
CN   107284224   10/2017
(Continued)

OTHER PUBLICATIONS

Extended European Search Report for European Application No. 18936528.1 dated Jul. 5, 2020 (7 pages).
International Search Report of PCT/CN2018/116578.

*Primary Examiner* — Tinh Dang

(57) ABSTRACT

Disclosed are an electric wheel assembly applicable for a parallelly mounted dual-tire wheel, an axle, and a vehicle. The electric wheel assembly includes a wheel and support axle assembly, an internal-rotor hub motor, a planetary gear reducer and a brake system. A planetary carrier is connected to a hub. The hub is connected to a spoke and a rim. The wheel support axle passes through a rotor sleeve and is provided with a hub bearing to support the hub and a whole wheel. A sun gear disposed at an end of the rotor sleeve of the internal-rotor hub motor is a power input of the planetary gear speed reducer, and the planetary carrier is a power output. A planetary gear of the planetary gear reducer is a tower-shaped gear and realizes a relatively high transmission ratio under a condition that an axial length is relatively small.

20 Claims, 10 Drawing Sheets

(51) Int. Cl.
| | |
|---|---|
| *B60B 35/16* | (2006.01) |
| *B60K 6/365* | (2007.10) |
| *B60K 7/00* | (2006.01) |
| *B60K 17/04* | (2006.01) |
| *B60T 1/06* | (2006.01) |
| *F16D 51/22* | (2006.01) |
| *F16D 65/28* | (2006.01) |
| *F16D 65/827* | (2006.01) |
| *F16H 1/28* | (2006.01) |
| *F16H 57/04* | (2010.01) |
| *H02K 5/20* | (2006.01) |
| *H02K 7/00* | (2006.01) |
| *H02K 7/08* | (2006.01) |
| *H02K 7/102* | (2006.01) |
| *H02K 7/116* | (2006.01) |
| *H02K 9/19* | (2006.01) |
| *H02K 9/26* | (2006.01) |
| *H02K 11/21* | (2016.01) |
| *H02K 24/00* | (2006.01) |
| *F16D 65/78* | (2006.01) |

(52) U.S. Cl.
CPC ............ *B60K 17/046* (2013.01); *B60T 1/067* (2013.01); *F16D 51/22* (2013.01); *F16D 65/827* (2013.01); *F16H 1/28* (2013.01); *F16H 57/046* (2013.01); *F16H 57/0471* (2013.01); *F16H 57/0476* (2013.01); *F16H 57/0486* (2013.01); *H02K 5/203* (2021.01); *H02K 7/006* (2013.01); *H02K 7/083* (2013.01); *H02K 7/102* (2013.01); *H02K 7/116* (2013.01); *H02K 9/19* (2013.01); *H02K 9/26* (2013.01); *H02K 11/21* (2016.01); *H02K 24/00* (2013.01); *B60K 2007/0038* (2013.01); *B60K 2007/0092* (2013.01); *F16D 2065/789* (2013.01)

(58) Field of Classification Search
CPC .... B60K 7/0007; B60K 17/046; B60K 17/08; B60K 2007/0038; B60K 2007/0092; F16D 51/22; F16D 65/28; F16D 2065/789; F16D 2121/08; F16D 2125/30
See application file for complete search history.

(56) References Cited

U.S. PATENT DOCUMENTS

| | | | |
|---|---|---|---|
| 7,214,155 B2* | 5/2007 | Mueller | B60K 7/0007 |
| | | | 475/5 |
| 9,550,414 B2 | 1/2017 | Kudo et al. | |
| 2010/0194180 A1 | 8/2010 | Gibson | |

FOREIGN PATENT DOCUMENTS

| | | | | |
|---|---|---|---|---|
| CN | 108128141 | | 6/2018 | |
| CN | 108146145 | | 6/2018 | |
| CN | 108340768 | | 7/2018 | |
| CN | 108749556 A | * | 11/2018 | ........... B60K 17/046 |
| DE | 2109372 A1 | | 9/1972 | |
| DE | 19527951 | | 2/1997 | |
| DE | 19527951 A1 | * | 2/1997 | ........... B60K 17/046 |
| DE | 102017105458 | | 9/2018 | |
| EP | 1329352 A2 | * | 7/2003 | ........... B60K 17/043 |
| EP | 2177387 A1 | | 4/2010 | |
| EP | 2568199 | | 3/2013 | |
| WO | WO-0103963 A1 | * | 1/2001 | ........... B60K 17/046 |
| WO | WO-02066280 A1 | * | 8/2002 | ........... B60K 17/046 |
| WO | WO-2007010843 A1 | * | 1/2007 | ........... B60K 17/043 |
| WO | WO2013/119047 A1 | | 8/2013 | |

* cited by examiner

ELECTRIC WHEEL ASSEMBLY APPLICABLE FOR PARALLELLY MOUNTED DUAL-TIRE WHEEL, AXLE, AND VEHICLE

CROSS-REFERENCE TO RELATED APPLICATIONS

This application claims all benefits accruing under 35 U.S.C. § 119 from China Patent Application No. 201811171038.X, filed on Oct. 9, 2018 in the China National Intellectual Property Administration, the entire content of which is hereby incorporated by reference. This application is a continuation under 35 U.S.C. § 120 of international patent application PCT/CN2018/116578, entitled "Electric Wheel Assembly Applicable for Parallelly Mounted Dual-Tire Wheel, Axle, and Vehicle" filed on Nov. 21, 2018, the content of which is also hereby incorporated by reference.

TECHNICAL FIELD

The present disclosure belongs to the field of new energy vehicle drive technology, and in particular, relates to an electric wheel assembly applicable for a parallelly mounted dual-tire wheel, an axle, and a vehicle.

BACKGROUND

A conventional commercial vehicle generally adopts a centralized drive method, and improvement of performance thereof is often restricted by many factors. For example, a transmission chain is long, and components such as a transmission shaft, a transfer case, and a differential are required, thus affecting the overall layout and lightweight. The low overall efficiency of the transmission system limits the number of drive axles, thus restricting the development of the vehicle towards long length and heavy load. Power is provided by a single engine, and the power transmission is a series-type transmission, thus causing poor reliability and poor fault tolerance. A power density is low, and dynamic performance is limited. Therefore, the development of high-power engine technology has become a bottleneck of technology improvement.

A new energy commercial vehicle using distributed electric drive technology can effectively break through the above limitations. The distributed drive schemes for the commercial vehicle in the prior art include a low-floor electric axle scheme adopting wheel-side motors for a coach and an electric wheel scheme adopting a hub motor.

Among them, the low-floor electric axle scheme is a typical distributed drive scheme adopting the wheel-side motors. In this configuration, two drive motors are symmetrically arranged at both sides of the axle housing, the axes of the motors are parallel or perpendicular to the axes of the wheels, and a two-stage reducer is adopted. The typical low-floor electric axles with motors arranged in parallel and perpendicularly to the wheels are shown in FIGS. 1 and 2, respectively. FIG. 1 shows an arrangement scheme of the patent "WHEEL-SIDE ELECTRIC DRIVE REDUCTION OF LOW-FLOOR AXLE" (patent number: CN203427602U), and FIG. 2 shows an arrangement scheme of the patent "WHEEL-SIDE ELECTRIC AXLE" (patent number: CN101830172A). However, the above schemes adopt a two-stage transmission and a disc brake, and thus the reduction mechanism and the brake system occupy relatively large axial space. Moreover, such a low-floor electric axle adopts an air spring suspension, and is not applicable to a commercial truck that uses a non-independent suspension.

In addition, in the distributed drive scheme adopting the hub motor, it is important for the electric wheel of the commercial vehicle to ensure the torque requirement of the electric wheel. Therefore, the electric wheel scheme with a large torque requirement mostly adopts a reduction drive configuration instead of a direct drive configuration adopting the hub motor. As shown in FIG. 3, in order to meet the torque requirement of the electric wheel, it is necessary to provide the electric wheel with a planetary gear reducer with a large speed ratio. FIG. 3 shows a scheme of the patent "ELECTRIC WHEEL AND VEHICLE WITH PLANETARY REDUCER OF LARGE SPEED RATIO" (patent number: CN404146145A). This arrangement can well meet the torque requirement of the electric wheel. However, as the reduction mechanism occupies a relatively large space, it cannot be used with the parallelly mounted dual-tire wheel, which is commonly used in the commercial vehicle, and is more difficult to be installed on the non-independent suspension of the conventional commercial vehicle. Moreover, a customized rim may also be required, and the cost is also relatively high.

SUMMARY

The present disclosure aims to solve at least one of technical problems existing in the prior art. In view of this, the present disclosure provides an electric wheel assembly applicable for a parallelly mounted dual-tire wheel, and an axle and a vehicle with the same. All components of the electric wheel assembly bear loads in a reasonable way, have light weight, and have compatibility among power, economy and reliability.

An electric wheel assembly applicable for a parallelly mounted dual-tire wheel according to the embodiments of the present disclosure includes a wheel and support axle assembly, an internal-rotor hub motor, a planetary gear reducer and a brake system. The wheel and support axle assembly comprises a tire, a rim, a spoke, a hub, an axle end cap, a hub bearing, a round nut and locking pin for the hub bearing, a wheel support axle, and an axle housing. The internal-rotor hub motor comprises a motor housing, a stator, a winding, a rotor, a rotor support, a motor bearing, and a resolver. The planetary gear reducer comprises a sun gear, a planetary gear, a planetary gear bearing, a planet carrier, a planetary gear pin shaft, a ring gear carrier, and a ring gear. The brake system is a drum brake system and comprises a brake drum, a brake shoe, and a brake end cap.

Further, the wheel and support axle assembly are provided with two tires and two rims; the two tires are installed on the two rims, respectively.

Further, the two rims are standard rims for the parallelly mounted dual-tire wheel and are arranged symmetrically with respect to a central surface of the electric wheel assembly.

Further, the spoke and spoke installation planes of the two rims are installed together; and the spoke is connected to the hub.

Further, the wheel support axle is a stepped shaft, and an end thereof having a relatively small outside diameter passes through the hub. The hub bearing is arranged between the wheel support axle and the hub. The round nut and locking pin for the hub bearing is installed on the end of the wheel support axle having the relatively small outer diameter; and another end of the wheel support axle is fixed inside the axle housing.

Further, the axle housing is a hollow cylindrical structure, and two ends thereof are provided with flanges, respectively; and the brake end cap of the brake system is installed on the flange.

Further, the motor housing of the internal-rotor hub motor comprises a stator housing, an inner end cap, an outer end cap, and a rotor sleeve.

Further, the stator housing is a cylindrical structure. An end of the stator housing is connected together with the inner end cap and the brake end cap, and another end of the stator housing is connected together with the outer end cap and the planetary gear reducer.

Further, the inner end cap has a stepped cross-section gradually expanding towards the axle housing, and an outmost ring-shaped end surface of the inner end cap is provided with a mounting hole configured to connect with the stator housing and the brake end cap, and the resolver of the internal-rotor hub motor and components of the brake system are arranged in internal space of the inner end cap with the stepped cross-section.

Further, the stator is sleeved on an inner ring-shaped surface of the stator housing. The rotor is sleeved over the rotor support, and the rotor support is sleeved over the rotor sleeve.

Further, the rotor sleeve is a stepped sleeve structure; one end of the rotor sleeve away from the axle housing is provided with a gear; the brake system is installed on another end of the rotor sleeve; the motor bearings are arranged between the rotor sleeve and the inner end cap and between the rotor sleeve and the outer end cap, respectively; and the resolver is disposed at a side, proximate to the axle housing, of the motor bearing proximate to the axle housing.

Further, the stator housing, the inner end cap, and the brake end cap are provided with openings. Three-phase wires of the internal-rotor hub motor are drawn out from a three-phase wire exit of the brake end cap, and low-voltage signal lines extend out from a signal wire exit of the brake end cap.

Further, a cooling manner is oil spray cooling for the internal-rotor hub motor. The stator housing is connected to a coolant inlet and a coolant outlet. A lubricating oil channel provided with a ring-shaped oil channel and an internal oil passage, an oil spray orifice, and an oil return opening are provided inside the stator housing to realize the oil spray cooling for the internal-rotor hub motor.

Alternatively, another cooling manner is an integrated cooling and lubrication for the wheel and support axle assembly, the internal-rotor hub motor, and the planetary gear reducer; for the integrated cooling and lubrication, an opening is disposed in the outer end cap of the internal-rotor hub motor, so that cooling oil enters the internal-rotor hub motor through a coolant inlet, and enters the planetary gear reducer, and then passes between the planetary gear and the hub bearing, and enters inside space of the hub, then flows back to the planetary gear reducer and a bottom of the internal-rotor hub motor, and flows out from a coolant outlet at the bottom of the internal-rotor hub motor; moreover, a screen and an attraction permanent magnet are installed adjacent to the opening of the outer end cap to filter and adsorb metal wear debris.

Further, the planetary gear reducer is arranged between the spoke and the internal-rotor hub motor, and is installed, together with the outer end cap of the rotor hub motor, on the stator housing.

Further, the sun gear of the planetary gear reducer is a power input end of the planetary gear reducer, and the planet carrier is a power output end of the planetary gear reducer.

Further, the planetary gear meshes with the sun gear and the ring gear, and a plurality of planetary gears are provided. Each planetary gear is supported on the planet carrier through the planetary gear pin shaft. The planetary gear bearing is provided between each planetary gear and the planetary gear pin shaft, and an end of the planetary gear pin shaft away from the axle housing is fixed together with the planet carrier and the hub.

Further, each planetary gear has a stepped and tower-shaped gear structure, and comprises a primary gear and a secondary gear. The primary gear meshes with the sun gear. The secondary gear is arranged to be coaxial with the primary gear and meshes with the ring gear, and a number of teeth of the secondary gear is less than that of the primary gear.

Further, the ring gear is sleeved inside the ring gear carrier. The ring gear carrier has a stepped sleeve structure; reinforcing ribs are arranged on an outside peripheral surface of the ring gear carrier. An end of the ring gear carrier with a relatively large diameter is connected to the internal-rotor hub motor, and another end of the ring gear carrier with a relatively small diameter is fixed to a ring gear end cap.

Further, a reducer oil seal is arranged between the ring gear carrier and the planet carrier to achieve a sealing of the planetary gear reducer. The axle end cap is arranged on an end of the hub away from the axle housing. A hub oil seal is arranged between the wheel support axle and the rotor sleeve. The reducer oil seal, the hub oil seal, and the axle end cap jointly realize a sealing of space between the hub and the wheel support axle.

Further, the brake system is a cam-actuated drum brake, and comprises an actuating cam, a cam shaft, and an actuation adjusting arm, a brake chamber push rod and a brake chamber.

Further, the brake shoe of the brake system is installed on the brake end cap fixed to an end of the axle housing, and air vents are disposed in the brake end cap to cool the brake system.

Further, the brake drum is located in space of the inner end cap and is sleeved outside an end of the rotor sleeve proximate to the axle housing. The brake drum and the rotor sleeve are connected through a spline for torque transmission, and heat-dissipation ribs are arranged on an outside peripheral surface of the brake drum.

Further, the brake system is further provided with another round nut and locking pin installed on an end of the rotor sleeve to position and fix the brake drum in an axial direction.

Further, the embodiments of the present disclosure include an axle including the above electric wheel assembly applicable for the parallelly mounted dual-tire wheel.

Further, the embodiments of the present disclosure include a vehicle including the above electric wheel assembly applicable for the parallelly mounted dual-tire wheel.

Further, the embodiments of the present disclosure include a vehicle including an axle, and the axle includes the above electric wheel assembly applicable for the parallelly mounted dual-tire wheel.

The electric wheel assembly applicable for the parallelly mounted dual-tire wheel has following advantages and beneficial effects.

1. The whole axial dimension of the entire electric wheel assembly is small. The internal-rotor hub motor, the planetary gear reducer, and the braking system are all arranged in the inside space defined by the inner rim and the spoke of the electric wheel assembly, making the electric wheel assembly applicable for a parallelly mounted dual-tire wheel of a common commercial vehicle. The rims are not necessarily customized, thereby effectively controlling the cost of the electric wheel assembly.

2. The rotor of the internal-rotor hub motor adopts the hollow cylindrical structure and is connected to the hollow rotor sleeve through the rotor support having the wheel-shaped structure, so that the wheel support axle may pass through the hollow portion.

3. The cylindrical structure of the axle housing has a regular shape and a relatively small diameter, and a suspension installation interface may be arranged more conveniently, which is directly compatible with the installation of a traditional leaf spring type suspension, and thus it is ensured that the electric wheel assembly of the parallelly mounted dual-tire wheel according to the embodiment may be applied to the non-independent suspension of a commercial vehicle without any modifications.

4. Compared with a traditional traction axle, the drive axle of the electric wheel assembly of the present disclosure only needs to be provided with the wheel support axle in the axle housing, but needs not to be provided with components such as a bevel gear reducer, a differential, a half shaft and a transfer case, and therefore the mass of the axle housing is also greatly reduced, which is beneficial to a great reduction of the mass of the drive axle, thereby reducing the unsprung weight of the commercial vehicle and improving the lightweight level of the whole vehicle.

5. The planetary gear of the planetary gear reducer uses the stepped and tower-shaped gears. On one hand, the transmission ratio of a single-stage planetary gear reducer is improved, and the output torque of the electric wheel assembly is ensured, so that the axle output torque of the electric wheel assembly of the present disclosure, compared with a traditional traction axle output torque, is improved. On the other hand, in a case that the transmission ratio is ensured to meet a requirement, this arrangement makes an axial dimension of the planetary gear reducer to be effectively reduced, so that a sum of the axial length of the internal-rotor hub motor and the axial length of the planetary gear reducer is not too long, and thus the internal-rotor hub motor and the planetary gear reducer may be arranged in the space defined by the spoke and the inner rim. Therefore, the overall position of the hub bearing is not too proximate to the outer side of the tire. In addition, the spoke is a hollow disk-shaped structure, which enables the hub and the wheel support axle to pass, and a symmetry plane of the two hub bearings is proximate to or coincides with the central surface of the electric wheel, so that the support manner of the electric wheel assembly is approximate the full-floating manner with the most reasonable load-bearing state.

6. The internal-rotor hub motor and the planetary gear reducer are both installed on the end of the axle through the brake end cap, and the motor housing and the ring gear carrier of the planetary gear reducer both are separated from the wheel support axle, so that the motor housing only bears its own weight and transmits the torque of the ring gear, and does not bear the load of the wheel, which is beneficial to the lightweight of the motor housing and the ring gear carrier, thereby being beneficial to the lightweight of the whole electric wheel assembly.

7. An electromechanical hybrid braking mode may be adopted. The brake drum of the brake system for providing a mechanical braking torque is connected to the rotor sleeve, and a braking friction torque is amplified by the planetary gear reducer before being transmitted to the wheel. Such an arrangement allows the diameter of the brake drum to be smaller, so that the brake drum may be arranged in the inner space of the inner end cap, thereby reducing an axial size of the electric wheel assembly, and effectively improving the lightweight level. Moreover, such an arrangement makes the actuating force of the actuation mechanism to be reduced, and therefore the size of the brake drum and the size of the brake chamber push rod may be reduced, so that the brake drum and the brake chamber push rod may be arranged at the inner side of the electric wheel assembly, thereby improving the integration of the system, and saving more space at the intermediate portion of the vehicle body. In addition, the air vents are disposed in the brake end cap to introduce the straight wind for cooling the brake system, and the heat-dissipation ribs are arranged on the brake drum to assist in dissipating the heat.

8. Without making greater changes, the separate cooling and lubrication scheme of the internal-rotor hub motor and the reducer can be changed into the integrated cooling and lubrication scheme. In the integrated cooling and lubrication scheme, the peak and the output torque and output power under continuous conditions of the internal-rotor hub motor may be greatly improved. The wheel and support axle assembly and the planetary gear reducer have also been cooled, the lubrication status has been effectively improved, and the integration of the entire electric wheel assembly has also been improved.

BRIEF DESCRIPTION OF THE DRAWINGS

The above and/or additional aspects and advantages of the present disclosure will become evident and easy to understand from the description of the embodiments with reference to the following drawings, where.

DETAILED DESCRIPTION OF THE EMBODIMENTS

Figure 1:
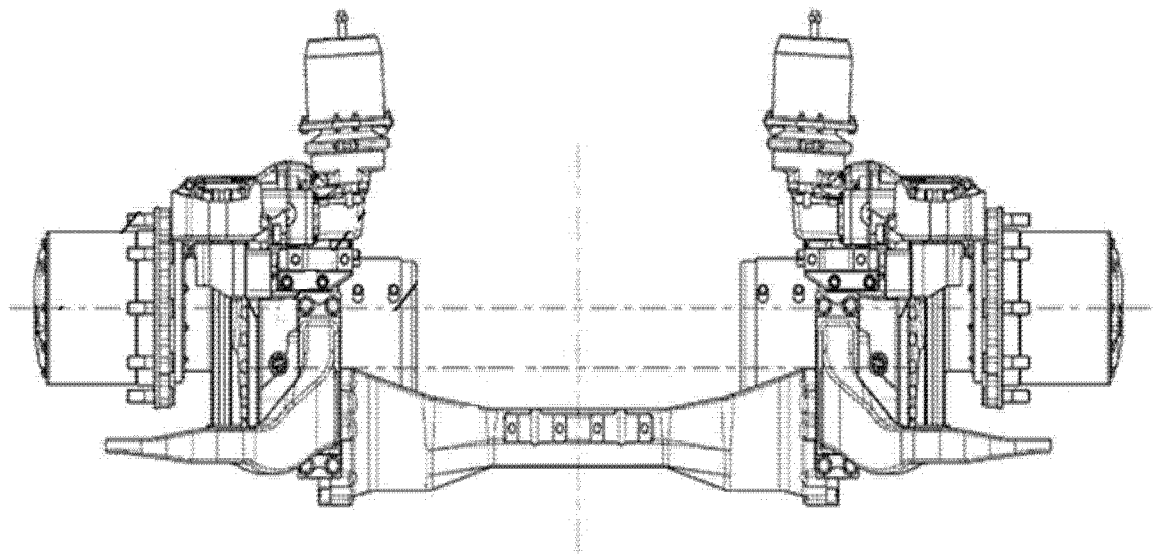
FIG. 1 is a schematic structural view of a low-floor electric drive axle of a typical arrangement manner in which axes of motors are arranged parallel to the axle.
Figure 2:
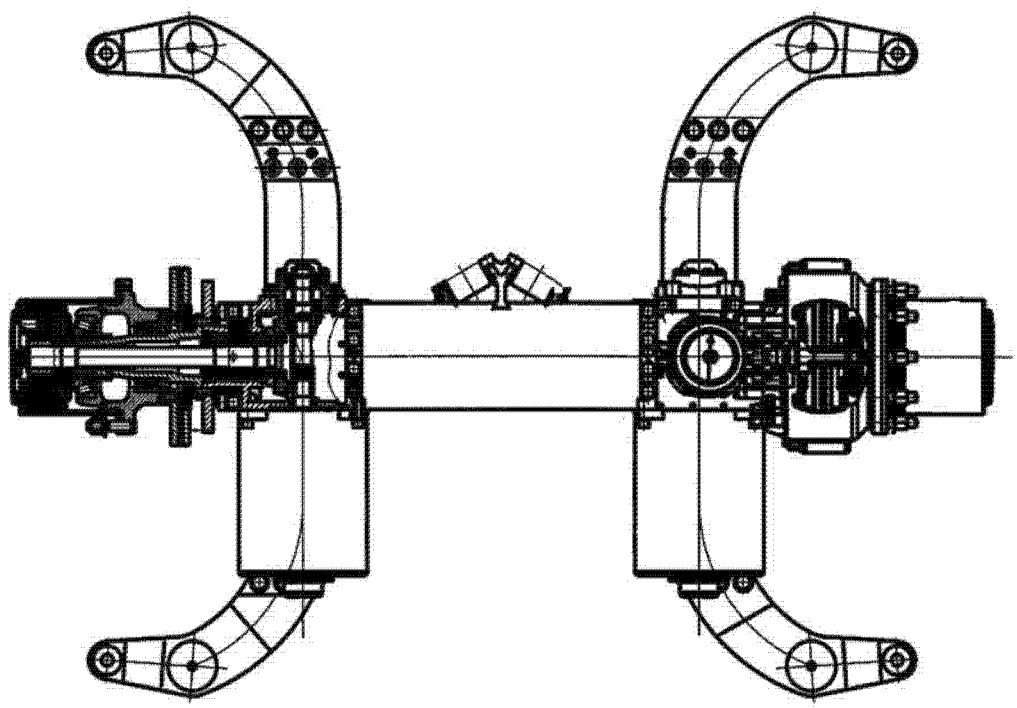
FIG. 2 is a schematic structural view of a low-floor electric drive axle of a typical arrangement manner in which the axes of the motors are arranged perpendicularly to the axle.
Figure 3:
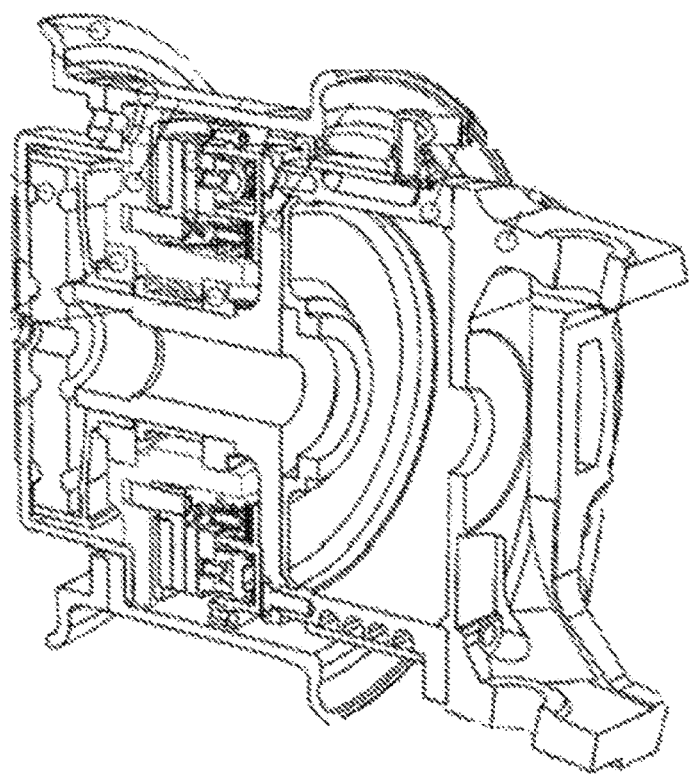
FIG. 3 is a sectional view of an electric wheel with a wheel hub motor provided with a planetary gear reducer having a large speed ratio.

The embodiments of the present disclosure will be described below in detail. Examples of the embodiments are shown in the accompanying drawings, in which the same or similar reference signs indicate the same or similar elements or elements with the same or similar functions. The embodiments described below with reference to the accompanying drawings are exemplary, and are only used to explain the present disclosure, but should not be understood as limitation on the present disclosure.

Without special description, in the present disclosure, the inner and outer directions are relative to the whole vehicle. Regardless of the left or right electric wheels of the vehicle, the "inner" side means a side adjacent to the center of the vehicle along the wheel axle, and the "outer" side means a side away from the center of the vehicle along the wheel axle.

Except "inner" and "outer", it should be understood that the terms in the description of the present disclosure, such as "center", "longitudinal", "transverse", "length", "width", "thickness", "upper", "lower", "front" "rear", "left", "right", "vertical", "horizontal", "top", "bottom", "axial", "radial", "circumferential" and other indications are based on the orientation or position relationships shown in the drawings, and are only used for the convenience of describing the present disclosure and simplifying the description, rather than indicating or implying that the devices or elements must have a specific orientation and must be constructed and operated in a specific orientation, therefore they cannot be understood as a limitation of the present disclosure. In addition, the features defined by "first" and "second" may explicitly or implicitly include one or more of these features. In the description of the present disclosure, unless otherwise specified, "plurality" means the number of two or more.

In the description of the present disclosure, it should be noted that, unless otherwise clearly defined and limited, the terms "installation", "connection", and "attachment" should be interpreted in a broad sense; for example, they may be interpreted as a fixed connection, a detachable connection, or an integrated connection; they may be interpreted as a mechanical connection or an electrical connection; they may be interpreted as a direct connection or an indirect connection through an intermediate medium, and they may be interpreted as an internal communication between two components. For those of ordinary skill in the art, the specific meanings of the above-mentioned terms in the present disclosure may be understood according to specific circumstances.

An electric wheel assembly applicable for a parallelly mounted dual-tire wheel of an embodiment of the present disclosure will be described with reference to FIGS. 4-11. In order to present details of the electric wheel assembly, FIG. 4 shows a portion of the electric wheel assembly above a central axis thereof.

Figure 4:
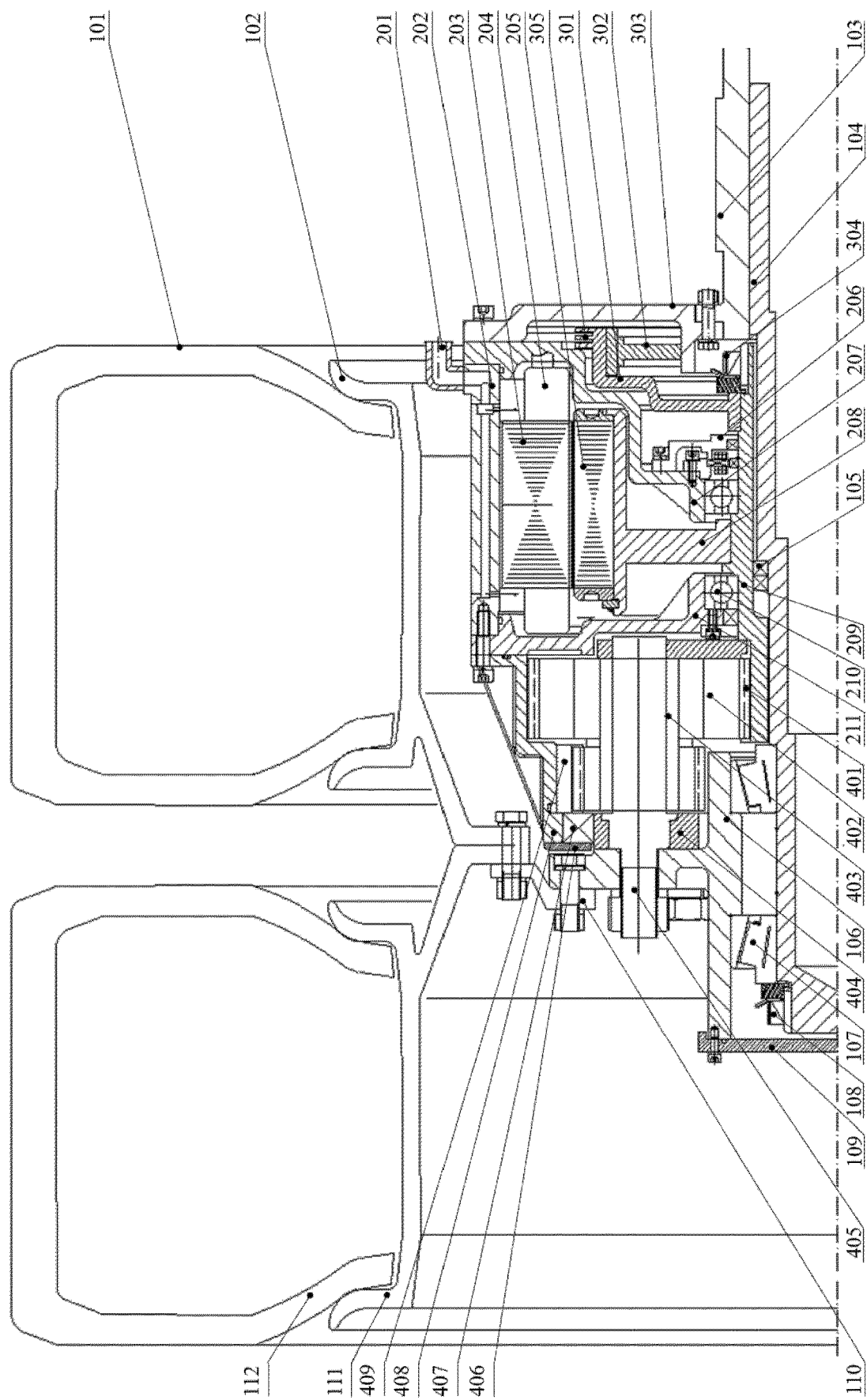
FIG. 4 is a longitudinal cross-sectional view of a portion of an electric wheel assembly above a central axis thereof according to the present disclosure.

As shown in FIG. 4, the electric wheel assembly applicable for the parallelly mounted dual-tire wheel of an embodiment of the present disclosure includes: a wheel and support axle assembly, an internal-rotor hub motor, a brake system, and a planetary gear reducer.

The wheel and support axle assembly includes: an inner tire 101, an inner rim 102, an outer tire 112, an outer rim 111, a spoke 110, a hub 106, a hub bearing 107, a round nut and locking pin 108 for the hub bearing, an axle end cap 109, a wheel support axle 104, an axle housing 103, etc.

Specifically, the inner tire 101 is installed on the inner rim 102, and the outer tire 112 is installed on the outer rim 111. The rims 102, 111 both may be a standard rim of a commonly used parallelly mounted dual-tire wheel, and are arranged symmetrically with respect to a central surface of the electric wheel assembly.

The spoke 110 and spoke installation planes of the two rims 102, 111 are installed together by a bolt. The spoke 110 is a hollow disk-shaped structure. A mounting hole, through which the spoke is connected with the rims 102, 111, is disposed in an exterior edge plane of the spoke; and another hole, through which the spoke is connected with the hub 106, is disposed in an interior edge plane of the spoke. The interior edge plane of the spoke 110 protrudes toward the outer side of the electric wheel assembly, so that there is relatively large space at the inner side of the spoke 110 to arrange the internal-rotor hub motor, the brake system, the planetary gear reducer, etc. It should be understood that the internal-rotor hub motor, the planetary gear reducer, and the brake system are all arranged in the inside space defined by the inner rim 102 and the spoke 110.

Specifically, the round opening in the center of the interior edge plane of the spoke 110 allows relevant parts of the planetary gear reducer and the hub 106 to pass therethrough.

The hub 106 is a cylindrical structure. A mounting flange is disposed on a middle portion of the outside peripheral surface of the hub 106 and is connected to the spoke 110. An inside peripheral surface of the cylindrical structure is in a suitable step shape, so as to facilitate positioning and fixing the hub bearing 107.

The wheel support axle 104 is a stepped shaft, and an end thereof having a relatively smaller outside diameter is arranged at the outer side of the wheel and passes through the hub 106. The hub bearing 107 is arranged between the wheel support axle 104 and the hub 106.

Further, two hub bearings 107 are provided, and a symmetry plane of the two hub bearings 107 is proximate to or coincides with the central surface of the electric wheel, so that the support manner of the electric wheel assembly is proximate to a full-floating manner with the most reasonable bearing state. In some embodiments, the hub bearing 107 may be a tapered roller bearing. Of course, the type of the hub bearing 107 is not limited to the above described type, and may be varied according to actual conditions during a practical application.

A round nut and locking pin 108 for the hub bearing is installed on the outer end of the wheel support axle 104, so as to position and fix the outer hub bearing 107 and to prevent the outer hub bearing 107 from moving in the axial direction. One end of the wheel support axle 104 with a relatively large diameter is arranged at the inner side of the wheel, and sleeved in the axle housing 103.

Figure 5:
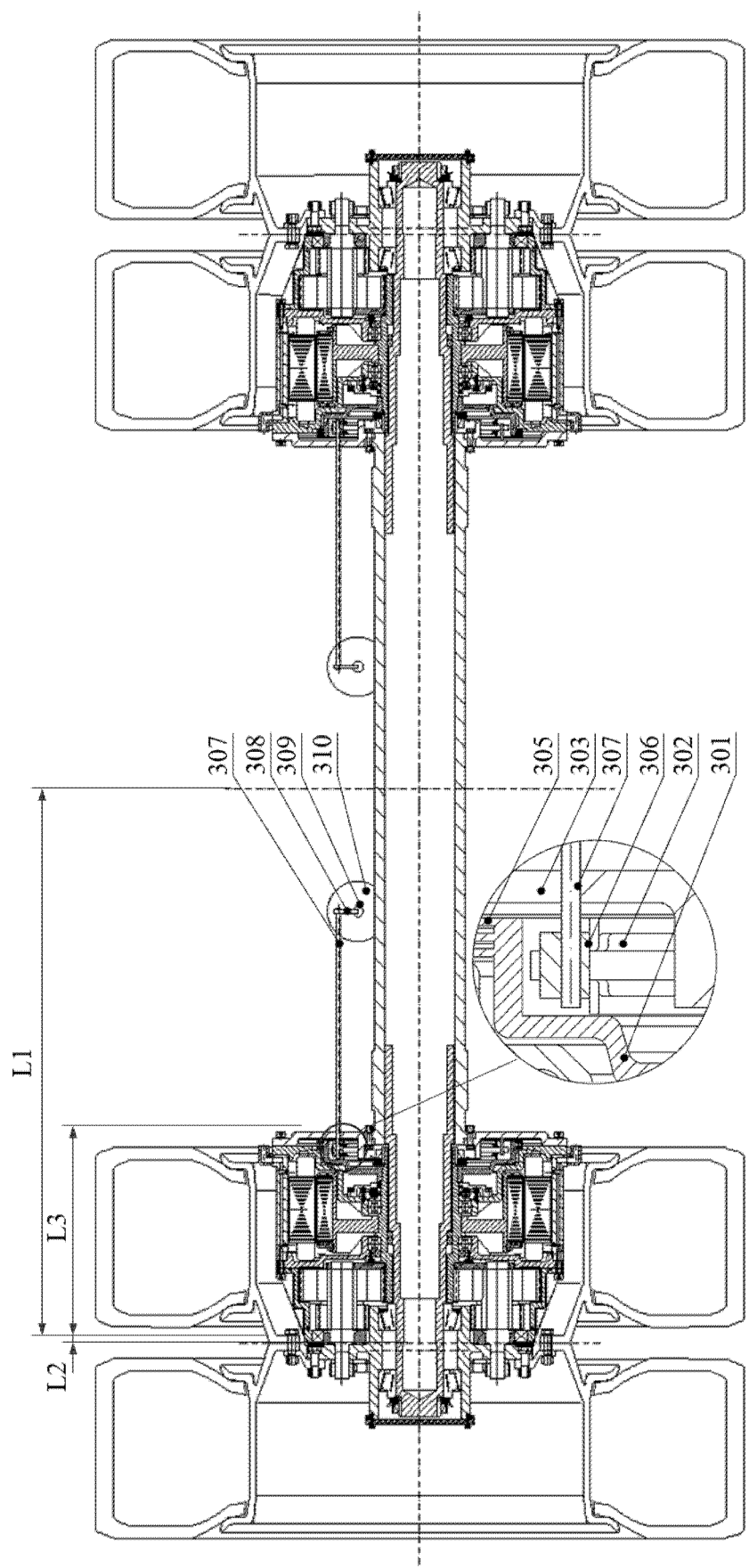
FIG. 5 is a horizontal sectional view along the central axis of a non-independent suspension axle of the electric wheel assembly of the present disclosure.

As shown in FIG. 5, which is a horizontal sectional view along the central axis of a drive axle with two electric wheel assemblies, the axle housing 103 is a hollow cylindrical structure, and two ends thereof are provided with flanges. A mounting hole for mounting a brake end cap 303 is arranged in the flange. It should be understood that because the cylindrical structure of the axle housing 103 has a regular shape and a relatively smaller diameter, a suspension installation interface may be arranged more conveniently, which is directly compatible with the installation of a traditional leaf spring type suspension. The axle housing 103 connects the two electric wheels. Moreover, for the drive axle of the electric wheel assembly of the present disclosure, only the wheel support axle needs to be arranged in the axle housing 103. Compared with a traditional traction axle, the present disclosure needs not to be provided with components such as a bevel gear reducer, a differential, a half shaft, and a transfer case, and therefore the mass of the axle housing 103 is also greatly reduced, which is beneficial to a great reduction of the mass of the drive axle, thereby reducing the unsprung weight of the commercial vehicle and improving the lightweight level of the whole vehicle.

The internal-rotor hub motor includes: a motor housing, a stator 203, a winding 204, a rotor 205, a rotor support 208, a motor bearing 210, a resolver 206, a coolant inlet 201, a coolant outlet 217, and three-phase wires 218.

The motor housing includes a stator housing 202, an inner end cap 207, an outer end cap 211, and a rotor sleeve 209.

Specifically, the inner end cap 207 has a stepped cross-section gradually expanding towards the inner side of the wheel. An outmost ring-shaped end surface of the inner end cap 207 is provided with a motor mounting hole matching with the brake end cap 303 and configured to connect with the stator housing 202 and the brake end cap 303. The resolver 206 of the internal-rotor hub motor and components of the brake system are arranged in internal space of the inner end cap 207 with the stepped cross-section. The stator housing 202 is a cylindrical structure, and threaded holes are disposed in circular surfaces of two ends of the stator housing 202 in the axial direction. By means of the threaded holes, the inner side of the stator housing 202 is connected together with the inner end cap 207 and the brake end cap 303, and the outer side of the stator housing 202 is connected together with the outer end cap 211 and the ring gear carrier 408 of the planetary gear reducer. It should be understood that in this arrangement, the internal-rotor hub motor and the planetary gear reducer are both installed on the brake end cap 303, the brake end cap 303 is fixed to the end of the axle housing 103, and the motor housing of the internal-rotor hub motor and the ring gear carrier 408 of the planetary gear reducer both are separated from the wheel support axle 104, so that the motor housing only bears its own weight and transmits the torque of the ring gear 409, and does not bear the load of the wheel, which is beneficial to the lightweight of the motor housing and the ring gear carrier 408, thereby being beneficial to the lightweight of the whole electric wheel assembly.

The internal-rotor hub motor is a motor with an internal rotor. The stator 203 is sleeved on the inside ring-shaped surface of the stator housing 202. The winding 204 is wound in the tooth grooves of the stator 203. The rotor 205 is disposed inside the stator 203, and there is an air gap between the stator 203 and the rotor 205. The rotor 205 is fixed on the rotor support 208. The rotor support 208 has a wheel-shaped structure. A wheel rim of the wheel-shaped structure is sleeved inside the rotor 205 and configured to install the rotor 205. A wheel hub of wheel-shaped structure is sleeved over the rotor sleeve 209. In some embodiments, an inner end of the wheel rim of the rotor support 208 has a protrusion configured to position the rotor 205, and an outer end thereof has a circlip groove for mounting a circlip, so as to fix the rotor 205. It should be understood that the arrangement of the circlip groove disposed on the outer end of the wheel rim of the rotor support 208 may save space at the inner end of the internal-rotor hub motor for the brake system. Of course, the location of the circlip groove is not limited to the outer end of the wheel rim of the rotor support 208. In a practical application, the connection manner between the rotor 205 and the rotor support 208 is not limited to the above-mentioned means of the circlip either, and may be adjusted in specific embodiments.

Two motor bearings 210 are arranged between the rotor sleeve 209 and the inner end cap 207, and between the rotor sleeve 209 and the outer end cap 211, respectively. In some embodiments, the motor bearing 210 is a deep groove ball bearing. Of course, the type of the motor bearing 210 is not limited to the above type, and may be varied according to actual conditions in a practical application. The resolver 206 is further arranged at the inner side of the motor bearing 210 disposed between the inner end cap 207 and the rotor sleeve 209.

It should be understood that since the rotor 205 has a hollow cylindrical structure and is connected to the hollow rotor sleeve 209 through the rotor support 208 having the wheel-shaped structure, the wheel support axle 104 may pass through the hollow portion, thereby ensuring that the electric wheel assembly may be applied to the axle scheme with a non-independent suspension.

An outer end of the rotor sleeve 209 adjacent to the outer side of the electric wheel assembly is provided with a gear, that is, the sun gear 401 of the planetary gear reducer. The sun gear 401 may be integrated with the rotor sleeve 209, or can be installed on the end of the rotor sleeve 209 by means of an interference fit, a spline, or a fastener. Another end of the rotor sleeve 209 adjacent to the inner side of the electric wheel has a thread configured to fix a braking round nut and a locking pin 304 of the brake system.

Figure 7:
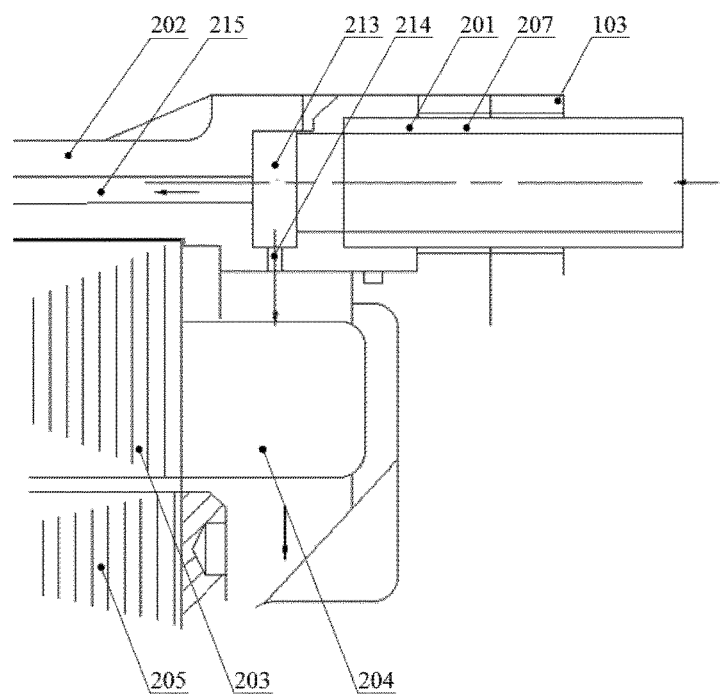
FIG. 7 is a partial vertical sectional view of a vicinity of a coolant inlet of an embodiment of the present disclosure, in which cooling oil enters and exits an inner end cap of a motor in an axial direction.
Figure 8:
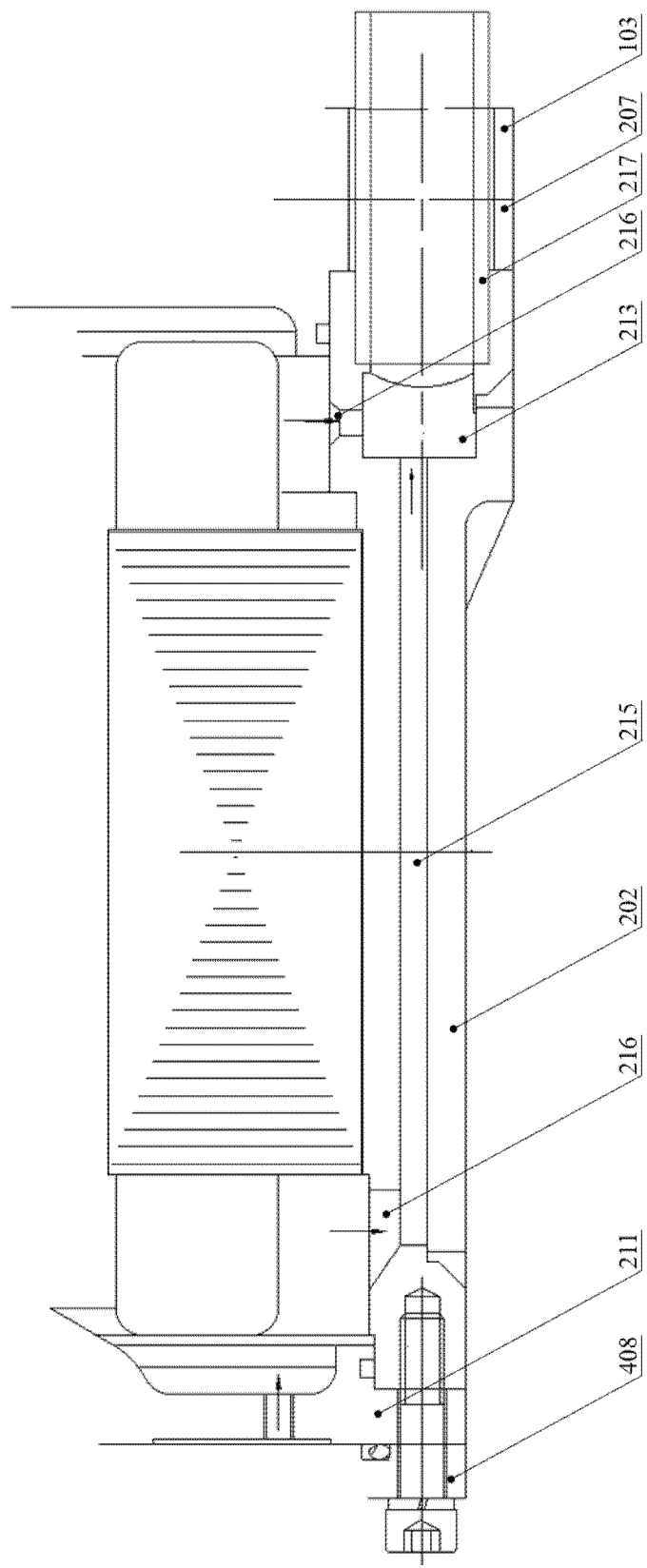
FIG. 8 is a partial vertical sectional view of the vicinity of the coolant outlet of an embodiment of the present disclosure, in which cooling oil enters and exits the inner end cap of the motor in the axial direction.

The cooling manner of the internal-rotor hub motor is oil spray cooling. As shown in FIGS. 7 and 8, the cooling oil enters the ring-shaped oil channel 213 of the stator housing 202 through a coolant inlet 201 located at a top of the stator housing 202. Passing through the ring-shaped oil channel 213, part of the cooling oil is distributed to oil spray orifices 214, proximate to the end, in the inner peripheral wall of the stator housing 202, and other part of the cooling oil passes through the inner flow channel 215 of the stator housing 202 and flows to oil spray orifices 214 disposed at the outer end of the internal-rotor hub motor. The returned cooling oil passes through the oil return openings 216 at two ends of the bottom of the stator housing 202 and the inner flow channel 215 at the bottom of the stator housing 202, and flows to a coolant outlet 217 of the internal-rotor hub motor.

Figure 6:
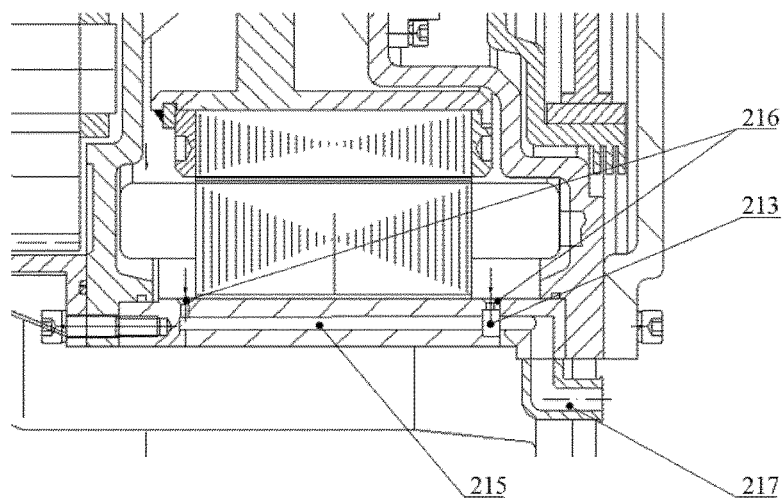
FIG. 6 is a partial vertical sectional view of a vicinity of a coolant outlet of the electric wheel assembly of the present disclosure.

FIGS. 4-6 show an arrangement of the oil inlet and the oil outlet. The coolant inlet 201 and the coolant outlet 217 are both arranged in a side surface of the internal-rotor hub motor, and the cooling oil enters and exits the stator housing 202 in radial directions. In some embodiments, the cooling oil may also directly enter the inlet and exit the outlet of the inner end cap 207 in the axial direction, as shown in FIGS. 7 and 8. In this arrangement, components such as the stator housing 202, the inner end cap 207, etc. have slightly different shapes, and the outer diameters of the ends of the stator housing 202 and the inner end cap 207 adjacent to the inner side of the electric wheel assembly are slightly larger than that of an intermediate section of the internal-rotor hub motor, so as to arrange the cooling oil inlet and outlet. In some other embodiments, if water cooling may meet the cooling requirements of the motor, water cooling may be adopted, and no oil spray orifice and no oil return opening are provided in the stator housing 202 accordingly. The coolant inlet 201 and the cooling outlet 217 function as the cooling water inlet and outlet, respectively, and the cooling water circulation can be realized by means of other channels in the stator housing. It is understandable that in such an embodiment, the stator housing 202 is similar to the water sleeve of the internal-rotor hub motor.

Figure 9:
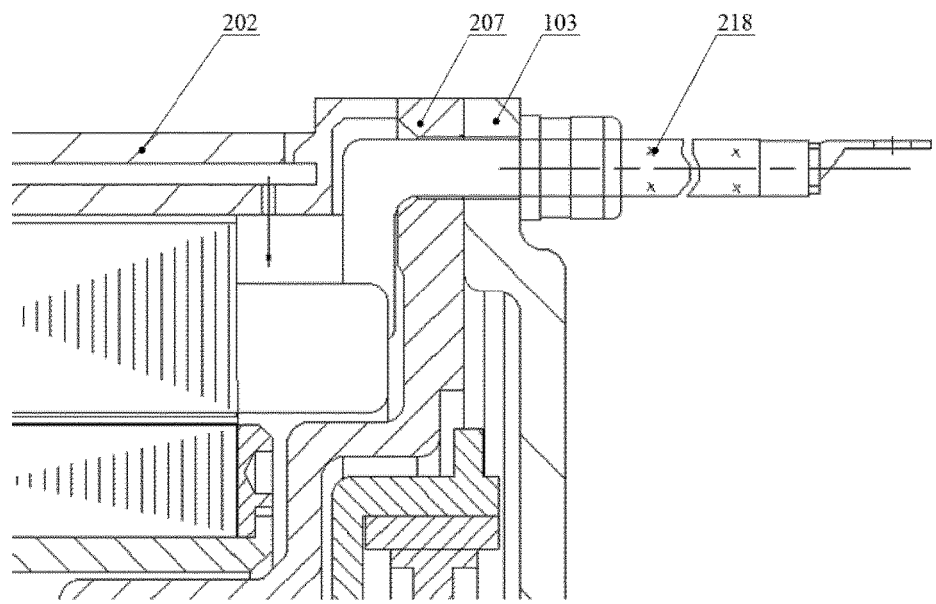
FIG. 9 is a partial oblique sectional view of a three-phase wire exit of a motor of the electric wheel assembly of the present disclosure.
Figure 10:
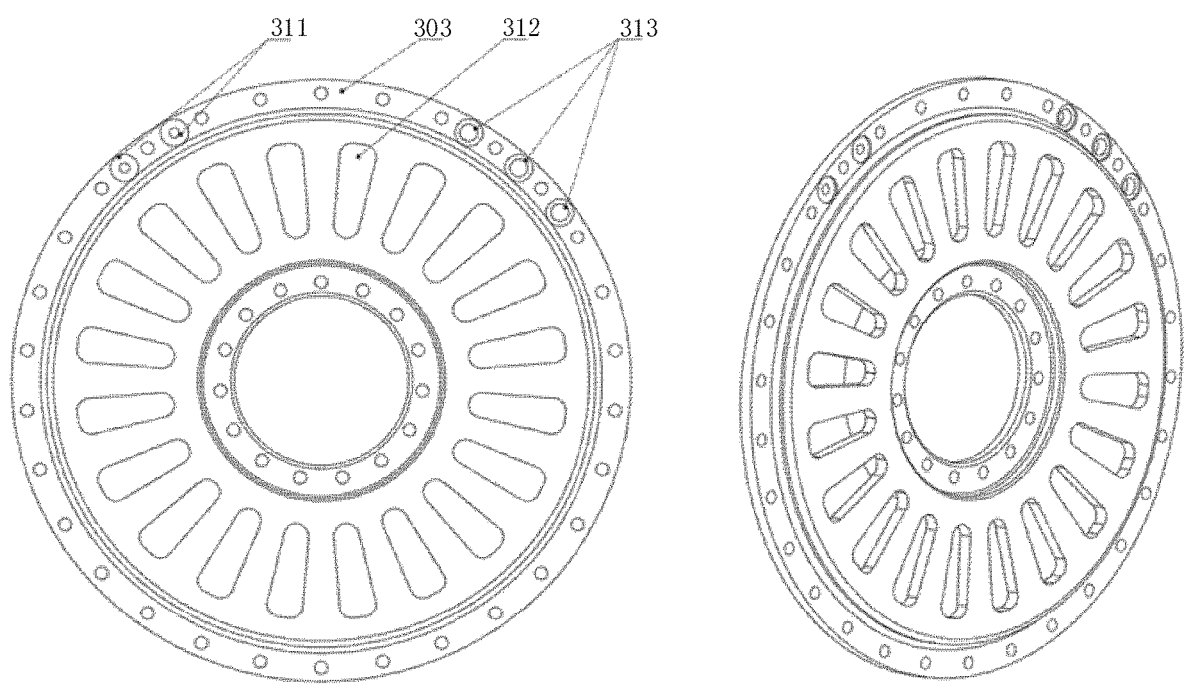
FIG. 10 is a front view and a perspective view of a brake end cap of the present disclosure.

Further, the stator housing 202, the inner end cap 207, and the brake end cap 303 are provided with openings, thus enabling the three-phase wires 218 of the internal-rotor hub motor to be drawn out from the three-phase wire exit 313 of the brake end cap 303, and allowing the low-voltage signal lines to extend out from the signal wire exit 311 of the brake end cap 303. FIG. 9 is a partial oblique sectional view of the three-phase wire exit 313, and FIG. 10 is a front view and a perspective view of the brake end cap 303. The brake end cap 303 is a hollow disc-shaped structure having a central round hole allowing the axle housing 103 to pass. Mounting holes are arranged on a circumference with a certain diameter outside the central round hole, and configured to allow the mounting flange at the end of the axle housing 103 to be connected. Motor mounting holes are arranged on the exterior edge of the brake end cap 303. The three-phase wire exits 313 and the signal wire exits 311 are arranged in two oblique upper sides of the brake end cap 303, respectively. The signal wires drawn out from the signal wire exit 311 include but are not limited to low-voltage signal lines of the resolver and a sensor, such as a motor temperature sensor. Air vents 312 are provided in the intermediate portion of the brake end cap 303. Further, a cylindrical protrusion and mounting holes, which are necessary for installing a brake shoe 302 and other components of the brake system, are provided at the outer end of the brake end cap 303.

The planetary gear reducer is arranged between the spoke 110 and the motor 2, and is installed, together with the outer end cap 211, inside the stator housing 202. The planetary gear reducer includes: a sun gear 401, a planetary gear 402, a planetary gear bearing 403, a planet carrier 404, a planetary gear pin shaft 405, a ring gear end cap 406, a ring gear carrier 408, a ring gear 409, etc.

The sun gear 401 is a gear structure disposed at one end of the rotor sleeve 209, and is a power input end of the planetary gear reducer. The sun gear 401 meshes with the planetary gear 402. A plurality of planetary gears 402 are provided, and each planetary gear 402 meshes with both the sun gear 401 and the ring gear 409. Each planetary gear 402 is supported on the planet carrier 404 through the planetary gear pin shaft 405. The planetary gear bearing 403 is provided between each planetary gear 402 and the planetary gear pin shaft 405. The outer end of the planetary gear pin shaft 405 passes through the mounting hole in the planet carrier 404 and the opening defined by the inner edge of the spoke 110. The outer end of the planetary gear pin shaft 405 is provided with threads to fix the planet carrier 404 to the hub 106. Moreover, the outer end of the planetary gear pin shaft 405 is fixed to the planet carrier 404, and the other end of the planetary gear pin shaft 405 is fixed to the planet carrier 404 by a circlip. The planet carrier 404 is a power output end of the planetary gear reducer.

Further, each planetary gear 402 has a stepped and tower-shaped gear structure, and includes a primary gear and a secondary gear. The primary gear meshes with the sun gear 401. The secondary gear is arranged to be coaxial with the primary gear and meshes with the ring gear 409. A number of the teeth of the secondary gear is less than that of the primary gear. By using the stepped and tower-shaped planetary gears, the gear ratio from the sun gear 401 to the planet carrier 404 may be effectively improved. The specific calculation formula of the gear ratio is:

$$i_{1H} = \left(\frac{z_2}{z_1}+1\right)\left(\frac{z_2}{z_3}+1\right)$$

Figure 11:
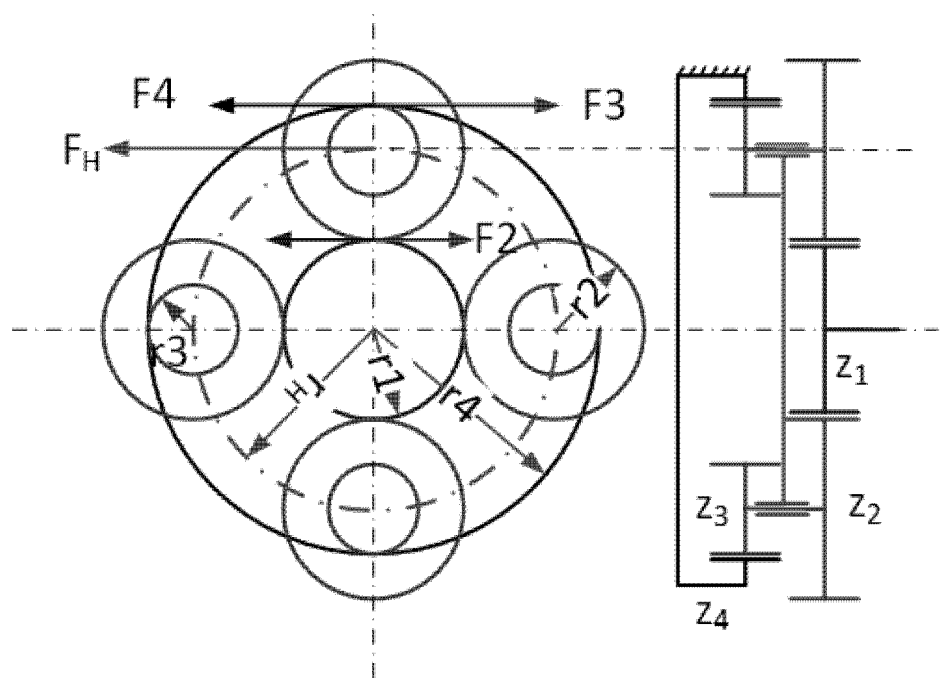
FIG. 11 is a schematic diagram illustrating a principle of a planetary gear reducer using tower-shaped gears of the electric wheel assembly of the present disclosure.

As shown in FIG. 11, the number of the teeth of the sun gear 401 is z1; the number of the teeth of the primary gear of the planetary gear 402 is z2; the number of the teeth of the secondary gear of the planetary gear 402 is z3; and the number of the teeth of the ring gear 409 is z4.

In summary, the planetary gear using the stepped and tower-shaped gears may achieve an effect similar to that of a two-stage planetary gear reducer. On one hand, the transmission ratio of a single-stage planetary gear reducer is improved, and the output torque of the electric wheel assembly is ensured, so that the axle output torque of the electric wheel assembly of the present disclosure, compared with a traditional traction axle output torque, is improved. On the other hand, the transmission ratio is ensured to be large enough while an axial dimension of the planetary gear reducer is effectively reduced, so that a sum of the axial length of the internal-rotor hub motor and the axial length of the planetary gear reducer is not too long, and thus the internal-rotor hub motor and the planetary gear reducer may be arranged in the space defined by the spoke 110 and the inner rim 102. Therefore, the overall position of the hub bearing is not too proximate to the outer side of the tire, and a support center thereof is proximate to the center of the wheel in the axial direction, and thus the support manner of the electric wheel assembly is approximate the full-floating manner with the most reasonable load-bearing state.

As shown in FIG. 4, the ring gear 409 is sleeved inside the ring gear carrier 408. The ring gear carrier 408 has a stepped sleeve structure, an end thereof with a relatively large diameter is connected to the internal-rotor hub motor, and another end thereof with a relatively small diameter is fixed to the ring gear end cap 406. In addition, reinforcing ribs are arranged on the outside peripheral surface of the ring gear carrier 408.

A reducer oil seal 407 is arranged between the ring gear carrier 408 and the planet carrier 404, so as to achieve the sealing of the planetary gear reducer. An axle end cap 109 is arranged on the outer end of the hub 106. A hub oil seal 105 is arranged between the wheel support axle 104 and the rotor sleeve 209. It can be understood that the hub oil seal 105, the reducer oil seal 407, and the axle end cap 109 jointly realize the sealing of the space between the hub and the wheel support axle.

Figure 12:
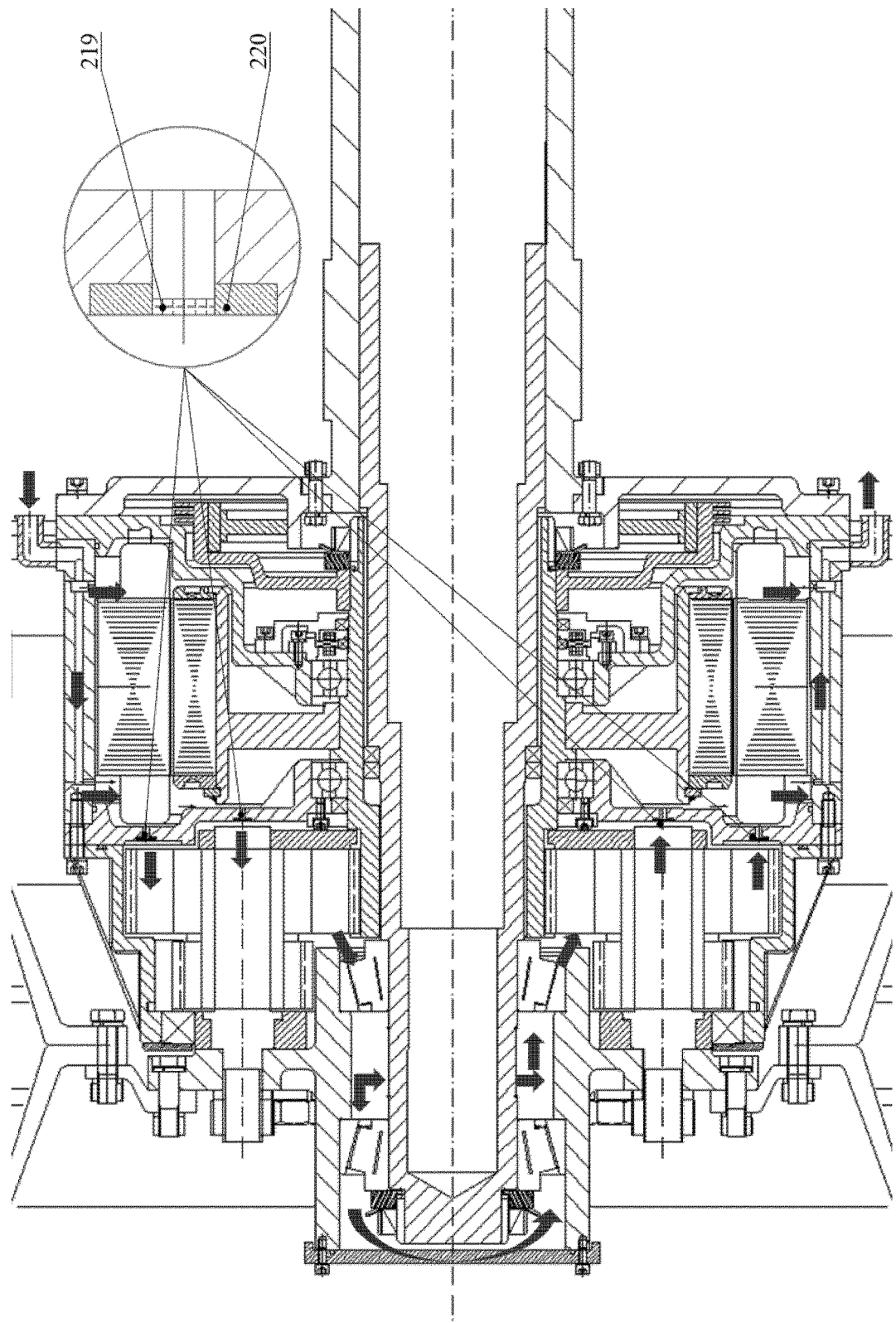
FIG. 12 is a vertical sectional view of flow directions of the cooling oil of an embodiment using integrated cooling and lubrication technology of the present disclosure.

It should be understood that, according to the above arrangement, the wheel, the support axle assembly, and the planetary gear reducer share one lubrication system and achieve a joint seal, while the internal-rotor hub motor has the independent oil spray cooling system or is cooled by the water sleeve. In some embodiments, a cooling and lubricating manner that integrates the cooling and the lubrication may also be used. The wheel, the support axle assembly, the internal-rotor hub motor, and the planetary gear reducer are integrally cooled and lubricated. In this embodiment, the outer end cap 211 of the internal-rotor hub motor has an opening enabling the cooling oil to enter the planetary gear reducer. The cooling oil passes between the planetary gear 402 and the inner hub bearing 107 and enters the inside space of the hub 106, and then flows back to the planetary gear reducer and the bottom of the internal-rotor hub motor, followed by flowing out from the coolant outlet at the bottom of the internal-rotor hub motor. FIG. 12 is a schematic view of the flow directions of the cooling oil of the embodiment using the integrated cooling and lubrication. In order to prevent wear debris generated by the planetary gear reducer from entering the internal-rotor hub motor and affecting the operation of the motor, a screen and an attraction permanent magnet are installed adjacent to the opening of the outer end cap 211 to filter and adsorb the metal wear debris. Further, for a vehicle adopting the electric wheel assembly of the present disclosure, a coolant heat-dissipation system adopting the integrated cooling and lubrication system and a filter device may be installed on the vehicle body.

The brake system is a drum brake system, and includes a brake drum 301, a brake shoe 302, etc. As shown in FIG. 4 and FIG. 10, the brake drum 301 is sleeved over the inner end of the rotor sleeve 209. The brake drum 301 and the rotor sleeve 209 are connected through a spline for torque transmission, and axially positioned and fixed through the round nut and locking pin 304. The brake drum 301 is arranged in the stepped inner space defined by the inner end cap 207. Heat-dissipation ribs 305 of the brake drum 301 are arranged on an outside peripheral surface of the brake drum 301. The brake shoe 302 is installed on the end surface of the brake end cap 303 facing the outer side of the wheel or installed on the cylindrical structure arranged on the end surface. The air vents 312 in the brake end cap 303 correspond to the positions of the heat-dissipation ribs 305 of the brake drum 301, so as to introduce straight wind for cooling the brake system. It should be understood that the brake drum 301 is mounted on the rotor sleeve 209, and a braking friction torque is amplified by the planetary gear reducer before being transmitted to the wheel. Such an arrangement allows the diameter of the brake drum 301 to be smaller, so that the brake drum 301 may be arranged in the inner space of the inner end cap 207, thereby reducing an axial size of the electric wheel assembly, and effectively improving the lightweight level.

In some embodiments, the brake system adopts a cam-actuated drum brake. The brake shoe 302 of each electric wheel assembly has two pieces, which are arranged up and down. Referring to FIG. 5, a horizontal sectional view showing the actuating mechanism of the brake system, the actuating mechanism includes an actuating cam 306, a cam shaft 307, an actuation adjusting arm 308, a brake chamber push rod 309, and a brake chamber 310. It should be understood that in a braking process, the brake chamber 310 pushes the brake chamber push rod 309 to move, thereby forcing the actuation adjusting arm 308 to swing, and thus driving the cam shaft 307 to rotate. Thereby, the actuating cam 306 rotates and pushes the brake shoe 302 to expend, and thus friction is generated between the brake shoe 302 and the brake drum 301. Of course, the type of the drum brake used by the brake system is not limited to the above type. In a practical application, the type of the drum brake can be varied according to actual situations.

Figure 13:
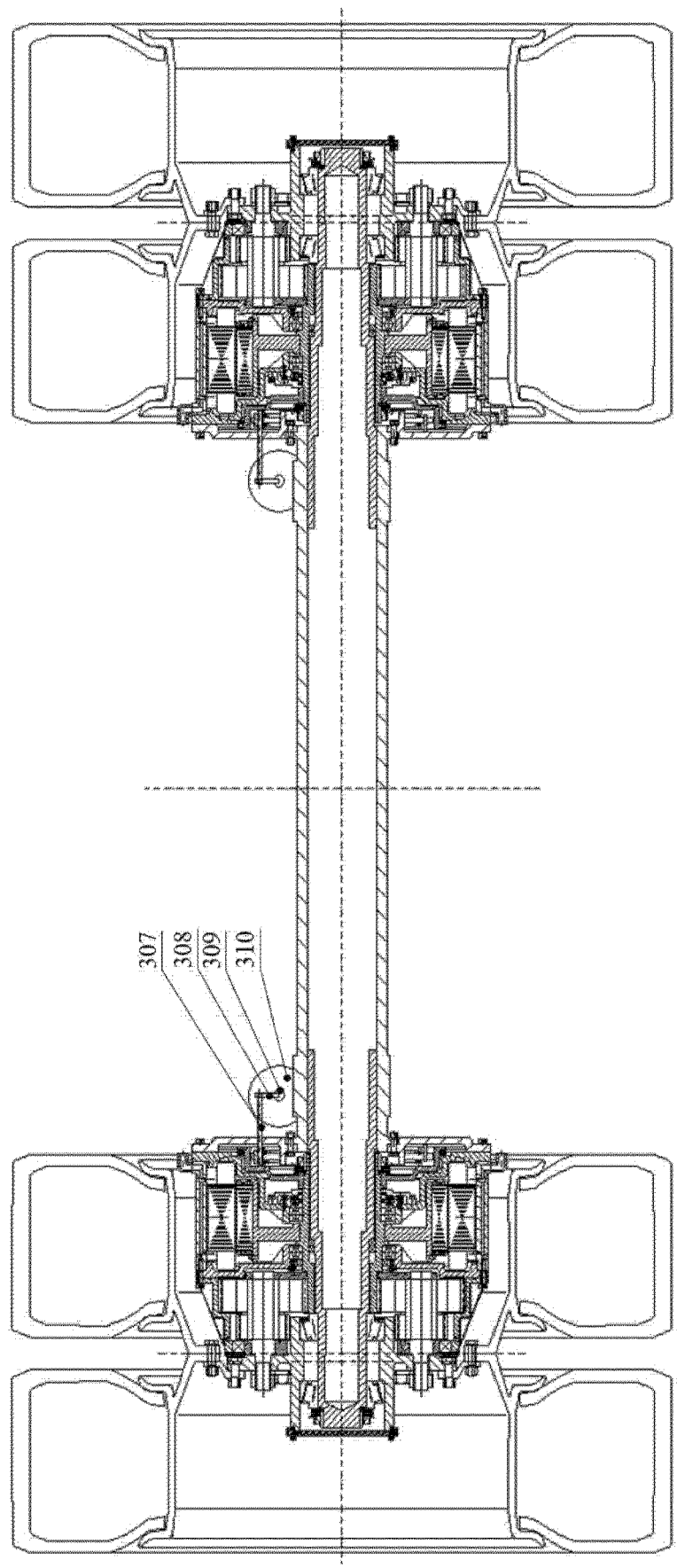
FIG. 13 is a horizontal sectional view of the non-independent suspension axle along the central axis of a brake and actuation mechanism directly installed near the electric wheel assembly of the present disclosure.

Specifically, as shown in FIG. 5, the brake chamber 310 and the brake chamber push rod 309 may be arranged on the intermediate portion of the axle housing 103, and attached to the axle housing 103 or installed on the vehicle frame at the intermediate portion the vehicle. In such an installation manner, a relatively long cam shaft 307 is required, which is the same as the arrangement of the cam-actuated drum brake of the traditional non-independent suspension. In some embodiments, as shown in the horizontal sectional view of FIG. 13, the brake chamber 310 and the brake chamber push rod 309 may also be installed on a component (e.g., the brake end cap 303) disposed on the inner end of the electric wheel assembly or on the end of the axle housing 103. It should be understood that as the brake drum 301 is mounted on the rotor sleeve 209, the mechanical braking force of the brake system may be amplified by the planetary gear reducer, which requires an actuating force smaller than that required in the case with the non-amplified mechanical braking force. Accordingly, the size of the brake drum 310 and the size of the brake chamber push rod 309 may be reduced, so that the brake drum 310 and the brake chamber push rod 309 may be arranged at the inner side of the electric wheel assembly and integrated with the electric wheel assembly, thereby improving the integration of the system, and saving more space at the intermediate portion of the vehicle body.

According to the electric wheel assembly of the present embodiment, when the vehicle is driven, based on a control strategy of the whole vehicle, a motor controller controls the current to pass through the three-phase wires 218 and flow to the winding 204 of the internal-rotor hub motor. The internal-rotor hub motor generates a torque to drive the rotor 205 to rotate. The rotor 205 outputs the torque through the rotor support 208 and the rotor sleeve 209, and the power is input into the planetary gear reducer through the sun gear 401 disposed at the end of the rotor sleeve 209. After the torque amplifying and the speed reduction by the planetary gear reducer, the power is output by the planet carrier 404 and transmitted to the hub 106 connected to the planet carrier 404, thereby transmitting the power to the spoke 110, the inner rim 102 and the outer rim 112, and thus driving the wheels to rotate.

According to the electric wheel assembly of the present embodiment, in the process of braking the vehicle, an electromechanical hybrid braking mode is adopted, and the braking force applied to the wheel is provided by both the brake system and the internal-rotor hub motor. The brake system generates a mechanical braking force, and the internal-rotor hub motor generates an electric braking force. When the vehicle drives at a high speed, the braking force is mainly provided by the internal-rotor hub motor. When the vehicle drives at a low speed or brakes urgently, the braking force is provided jointly by the internal-rotor hub motor and the brake system, or is provided only by the brake system. A coordinated control may be realized between the mechanical brake and the electric brake by a certain control algorithm, and a brake energy recovery is realized under the premise of ensuring safety. For example, according to an electromechanical hybrid braking control algorithm, when the vehicle drives at a speed higher than a certain vehicle speed, and when a brake pedal action input by a driver meets a certain condition, an electric braking torque is generated by the internal-rotor hub motor and output by the rotor sleeve 209, and is applied to the spoke 110, the inner rim 102, and the outer rim 111 via the planetary gear reducer and the hub 106, thereby functioning as a brake. When the vehicle drives at a speed lower than a certain vehicle speed, and when the brake pedal action meets a certain condition, the brake system and the internal-rotor hub motor both work to control the brake chamber 310 to drive the actuating mechanism of the brake system, and the actuating cam 306 rotates to drive the brake shoe 302 to expand to generate a friction braking force. The braking force of the brake drum 301 is also applied to the rotor sleeve 209, and is finally output to the spoke 110, the inner rim 102, and the outer rim 111, thereby functioning as a brake. When the vehicle drives at a speed lower than the certain vehicle speed, or when the brake pedal action satisfies a certain condition, the electric braking force is cancelled, and the braking force is generated only by the brake system to brake the vehicle. In addition, when the brake pedal action meets the certain condition for an emergency braking and the vehicle drives at a relatively high speed, the brake system may be controlled to generate a mechanical braking force as well.

Referring to FIGS. 4, 5, 6, 9, and 10, a specific structure of an embodiment of an electric wheel assembly applicable for a parallelly mounted dual-tire wheel of a 13-ton drive axle of a tractor according to the present disclosure will be described.

The electric wheel assembly applicable for the parallelly mounted dual-tire wheel of an embodiment of the present disclosure includes: the wheel and support axle assembly, the internal-rotor hub motor, the brake system, and the planetary gear reducer.

The wheel and support axle assembly includes: the inner tire 101, the inner rim 102, the outer tire 112, the outer rim 111, the spoke 110, the hub 106, the hub bearing 107, the round nut and locking pin 108 for the hub bearing, the axle end cap 109, the wheel support axle 104, the axle housing 103, etc.

Specifically, the inner tire 101 is installed on the inner rim 102, and the outer tire 112 is installed on the outer rim 111. Both tires are common 12R22.5 tires for the dual-tire wheel of the 13-ton drive axle. The inner rim 102 and the outer rim 111 are both standard rims matching 12R22.5 tires, and are arranged symmetrically with respect to the central surface of the electric wheel assembly.

The spoke 110 and the spoke installation planes of the inner rim 102 and the outer rim 111 are installed together by a bolt. The spoke 110 is a hollow disk-shaped structure. An mounting hole, through which the spoke is connected with the rims, is disposed in an exterior edge plane of the spoke; and another hole, through which the spoke is connected with the hub, is disposed in an interior edge plane of the spoke. The interior edge plane of the spoke 110 protrudes to the outer side of the electric wheel assembly, so that there is relatively large space at the inner side of the spoke 110 to arrange the internal-rotor hub motor, the brake system, the planetary gear reducer, etc.

Specifically, the round opening at the center of the interior edge plane of the spoke 110 allows relevant parts of the planetary gear reducer and the hub 106 to pass therethrough.

The hub 106 is a cylindrical structure. The mounting flange is disposed on the middle portion of the outside peripheral surface of the hub 106. The flat disc-shaped structure has a mounting hole for connecting to the spoke 110. The inside peripheral surface of the cylindrical structure is in a suitable step shape, so as to facilitate positioning and fixing the hub bearing 107.

The wheel support axle 104 is a stepped shaft, and the end thereof having the relatively smaller outside diameter is arranged at the outer side of the wheel and passes through the hub 106. The hub bearing 107 is arranged between the wheel support axle 104 and the hub 106.

Further, two hub bearings 107 are provided. As shown in FIG. 5, a distance between the symmetry plane of the two hub bearings 107 and the central surface of the electric wheel is L2. L2 may be reduced to about 10 mm, thereby making the support manner of the electric wheel assembly proximate to the most reasonable full-floating manner.

The round nut and locking pin 108 for the hub bearing is installed on the outer end of the wheel support axle 104, so as to position and fix an outer hub bearing 107 and to prevent the outer hub bearing 107 from moving in the axis direction. One end of the wheel support axle 104 with a relatively large diameter is arranged at the inner side of the wheel, and sleeved in the axle housing 103.

The axle housing 103 is a hollow cylindrical structure, and two ends thereof are provided with flanges. A mounting hole for mounting the brake end cap 303 is arranged in the flange. The cylindrical structure of the axle housing 103 has a regular shape and a relatively smaller diameter, therefore the suspension installation interface may be arranged more conveniently, which is directly compatible with the installation of a traditional leaf spring type suspension. FIG. 5 is a horizontal sectional view along the central axis of a drive axle with two electric wheel assemblies. L1 is a half of a track width of the drive axle. It is easy to modify L1 according to an actual application situation. In this embodiment, an internal space between two electric wheels may reach 2×(L1−L2)=1150 mm, thereby leaving large axial space for connecting the suspension and the brake system, and also providing convenience for arranging the vehicle frame and the vehicle body.

The internal-rotor hub motor includes: the motor housing, the stator 203, the winding 204, the rotor 205, the rotor support 208, the motor bearing 210, the resolver 206, the coolant inlet 201, the coolant outlet 217, and the three-phase wires 218.

The motor housing includes the stator housing 202, the inner end cap 207, the outer end cap 211, and the rotor sleeve 209.

Specifically, the inner end cap 207 has the stepped cross-section gradually expanding towards the inner side of the wheel. The outmost ring-shaped end surface of the inner end cap 207 is provided with the motor mounting hole matching with the brake end cap 303. The stator housing 202 is a cylindrical structure, and threaded holes are disposed in circular surfaces of two ends of the stator housing 202 in the axial direction. By means of the threaded holes, the inner side of the stator housing 202 is connected together with the inner end cap 207 and the brake end cap 303, and the outer side of the stator housing 202 is connected together with the outer end cap 211 and the ring gear carrier 408 of the planetary gear reducer.

The internal-rotor hub motor is a motor with an internal rotor. The stator 203 is sleeved on the inside ring-shaped surface of the stator housing 202. The winding 204 is wound in the tooth grooves of the stator 203. The rotor 205 is disposed inside the stator 203, and there is an air gap between the stator 203 and the rotor 205. The rotor 205 is fixed on the rotor support 208. The rotor support 208 has a wheel-shaped structure. The wheel rim of the wheel-shaped structure is sleeved inside the rotor 205 and configured to install the rotor 205. The wheel hub of wheel-shaped structure is sleeved outside the rotor sleeve 209. The inner end of the wheel rim of the rotor support 208 has the protrusion configured to position the rotor 205, and the outer end thereof has the circlip groove for mounting the circlip, so as to fix the rotor 205.

Two motor bearings 210 are arranged between the rotor sleeve 209 and the inner end cap 207, and between the rotor sleeve 209 and the outer end cap 211, respectively. The resolver 206 is further arranged at an inner side of the motor bearing 210 disposed between the inner end cap 207 and the rotor sleeve 209.

The outer end of the rotor sleeve 209 adjacent to the outer side of the electric wheel assembly is provided with a gear, that is, the sun gear 401 of the planetary gear reducer. The other end of the rotor sleeve 209 adjacent to the inner side of the electric wheel has a thread configured to fix the braking round nut and the locking pin 304 of the brake system.

The cooling manner of the internal-rotor hub motor is oil spray cooling. As shown in FIGS. 7 and 8, the cooling oil enters the ring-shaped oil channel 213 of the stator housing 202 through a coolant inlet 201 located at a top of the stator housing 202. Passing through the ring-shaped oil channel, part of the cooling oil is distributed to oil spray orifices 214, proximate to the end, in the inside peripheral wall of the stator housing 202, and other part of the cooling oil passes through the inner flow channel 215 of the stator housing 202 and flows to oil spray orifices 214 disposed at the outer end of the internal-rotor hub motor. The return cooling oil passes through the oil return openings 216 at two ends of the bottom of the stator housing 202 and the inner flow channel 215 at the bottom of the stator housing 202, and flows to a coolant outlet 217 of the internal-rotor hub motor. FIGS. 4-6 show an arrangement of the oil inlet and the oil outlet. The coolant inlet 201 and the coolant outlet 217 are both arranged on the side surface of the internal-rotor hub motor, and the cooling oil enters and exits the stator housing 202 in radial directions.

Further, the stator housing 202, the inner end cap 207, and the brake end cap 303 are all provided with openings, thus enabling the three-phase wires 218 of the internal-rotor hub motor to be drawn out from the three-phase wire exit 313 of the brake end cap 303, and allowing the low-voltage signal lines to extend out from the signal wire exit 311 of the brake end cap 303. FIG. 9 is a partial oblique sectional view of the three-phase wire exit 313, and FIG. 10 is a front view and a perspective view of the brake end cap 303. The brake end cap 303 is a hollow disc-shaped structure having the central round hole allowing the axle housing 103 to pass. The mounting holes are arranged on a circumference of a certain diameter outside the central round hole, and configured to connect the mounting flange at the end of the axle housing 103. The motor mounting holes are arranged on the exterior edge of the brake end cap 303. The three-phase wire exits 313 and the signal wire exits 311 are arranged at two oblique upper sides of the brake end cap 303, respectively. The signal wires drawn out from the signal wire exit 311 include but are not limited to low-voltage signal lines of the resolver and a sensor, such as a motor temperature sensor. The air vents 312 are provided in the intermediate portion of the brake end cap 303. Further, a cylindrical protrusion and mounting holes, which are necessary for installing the brake shoe 302 and other components of the brake system, are provided at the outer end of the brake end cap 303.

The planetary gear reducer is arranged between the spoke 110 and the motor 2, and is installed, together with the outer end cap 211, inside the stator housing 202. The planetary gear reducer includes: the sun gear 401, the planetary gear 402, the planetary gear bearing 403, the planet carrier 404, the planetary gear pin shaft 405, the ring gear end cap 406, the ring gear carrier 408, the ring gear 409, etc.

The sun gear 401 is a gear structure disposed at one end of the rotor sleeve 209, and is the power input end of the planetary gear reducer. The sun gear 401 meshes with the planetary gear 402. A plurality of planetary gears 402 are provided, and each planetary gear 402 meshes with both the sun gear 401 and the ring gear 409. Each planetary gear 402 is supported on the planet carrier 404 through the planetary gear pin shaft 405. The planetary gear bearing 403 is provided between each planetary gear 402 and the planetary gear pin shaft 405. The outer end of the planetary gear pin shaft 405 passes through the mounting hole in the planet carrier 404 and the opening defined by the inner edge of the spoke 110. The outer end of the planetary gear pin shaft 405 is provided with threads to fix the planet carrier 404 to the hub 106. Moreover, the outer end of the planetary gear pin shaft 405 is fixed to the planet carrier 404, and the other end of the planetary gear pin shaft 405 is fixed to the planet carrier 404 by means of the circlip. The planet carrier 404 is the power output end of the planetary gear reducer.

Further, each planetary gear 402 has a stepped and tower-shaped gear structure, and includes the primary gear and the secondary gear. The primary gear meshes with the sun gear 401. The secondary gear is arranged to be coaxial with the primary gear and meshes with the ring gear 409. The number of the teeth of the secondary gear is less than that of the primary gear. The planetary gear using the stepped and tower-shaped gears may achieve the effect similar to that of a two-stage planetary gear reducer, and the transmission ratio is ensured to be large enough while the axial dimension of the planetary gear reducer is effectively reduced, so that the sum of the axial length of the internal-rotor hub motor and the axial length of the planetary gear reducer is not too long, and thus the internal-rotor hub motor and the planetary gear reducer may be arranged in the space defined by the spoke 110 and the inner rim 102.

According to the electric wheel assembly of the present disclosure, in a specific embodiment, a dimension L3 from the inner end surface of the disc-shaped structure of the axle housing 103 to the central surface of the electric wheel is 355 mm, which ensures that the electric wheel assembly may be applicable to the parallelly mounted dual-tire wheel. In this specific embodiment, the number of the teeth of the sun gear 401 is $z1=40$; the number of the teeth of the primary gear of the planetary gear 402 is $z2=46$; the number of the teeth of the secondary gear of the planetary gear 402 is $z3=26$; and the speed ratio of the planetary gear reducer is 5.95. In the specific embodiments, a peak output torque of the motor may reach more than 2,500 Nm, a peak torque of the electric wheel may reach about 15,000 Nm, and the peak torque of the drive axle using the electric wheel may reach 30,000 Nm, and thus the drive axle has superior power performance.

The ring gear 409 is sleeved inside the ring gear carrier 408. The ring gear carrier 408 has a stepped sleeve structure, an end thereof with a relatively large diameter is connected to the internal-rotor hub motor, and another end thereof with a relatively small diameter is fixed to the ring gear end cap 406. The reinforcing ribs are arranged on the outside peripheral surface of the ring gear carrier 408.

The reducer oil seal 407 is arranged between the ring gear carrier 408 and the planet carrier 404, so as to achieve the sealing of the planetary gear reducer. The axle end cap 109 is arranged on the outer end of the hub 106. The hub oil seal 105 is arranged between the wheel support axle 104 and the rotor sleeve 209. It can be understood that the hub oil seal 105, the reducer oil seal 407, and the axle end cap 109 jointly realize the sealing of the space of the hub and the wheel support axle.

The brake system is the drum brake system, and includes the brake drum 301, the brake shoe 302, etc. The brake drum 301 is sleeved over the inner end of the rotor sleeve 209. The brake drum 301 and the rotor sleeve 209 are connected through a spline for torque transmission, and axially positioned and fixed through the round nut and the locking pin 304. The brake drum 301 is arranged in the stepped inner space defined by the inner end cap 207. The heat-dissipation ribs 305 of the brake drum 301 are arranged on the outside peripheral surface of the brake drum 301. The brake shoe 302 is installed on the end surface of the brake end cap 303 facing the outer side of the wheel or installed on the cylindrical structure arranged on the end surface. The air vents 312 in the brake end cap 303 correspond to the positions of the heat-dissipation ribs 305 of the brake drum 301, so as to introduce the straight wind for cooling the brake system.

The brake system adopts the cam-actuated drum brake. The brake shoe 302 of each electric wheel assembly has two pieces, which are arranged up and down. Referring to FIG. 5, a horizontal sectional view showing the actuating mechanism of the brake system, the actuating mechanism includes an actuating cam 306, a cam shaft 307, an actuation adjusting arm 308, a brake chamber push rod 309, and a brake chamber 310. As shown in FIG. 5, the brake chamber 310 and the brake chamber push rod 309 may be arranged on the intermediate portion of the axle housing 103, and attached to the axle housing 103 or installed on the vehicle frame at the intermediate portion the vehicle, which is the same as the arrangement of the cam-actuated drum brake of the traditional non-independent suspension.

The electric wheel assembly applicable for the parallelly mounted dual-tire wheel of the present disclosure provides an electric wheel scheme adopting the hub motor for the deceleration and driving, having high power and torque density, light weight, and reasonably loaded components. Under the condition that power, efficiency, sealing and heat dissipation are taken into account, a total mass is reduced as much as possible.

The electric wheel assembly of the present disclosure may be applied to various forms of electric vehicles or hybrid electric vehicles, and is especially applicable for commercial vehicles having large torque requirements, having heavy loads, and using non-independent suspensions. Although the embodiments of the present disclosure have been shown and described, the present disclosure is not limited to the application in the vehicle with the non-independent suspension. After removing the axle housing 103 and further designing a corresponding steering knuckle assembly, the electric wheel assembly of the present disclosure can also be applied to a parallelly mounted dual-tire wheel with the independent suspension. Moreover, the present disclosure is applicable for non-commercial vehicles, such as two-wheel vehicles, low-speed electric vehicles used by the elderly or the disabled, heavy-duty vehicles, special vehicles, or crawler vehicles in the industry such as mining or construction, etc. Those of ordinary skill in the art can understand that various changes, amendments, substitutions and modifications can be made for these embodiments without departing from the principle and purpose of the present disclosure, and the scope of the present disclosure is defined by the claims and equivalents thereof.

In the description of this specification, the description with reference to the terms "an embodiment", "some embodiments", "exemplary embodiment", "examples", "specific embodiment", or "some examples" etc. means that specific features, structures, materials or characteristics described in combining with an embodiment or an example are included in at least one embodiment or example of the present disclosure. In the specification, the illustrative description of the above-mentioned terms does not necessarily refer to the same embodiment or example. Moreover, the described specific features, structures, materials or characteristics can be combined in any one or more embodiments or examples in a suitable manner.

What is claimed is:

1. An electric wheel assembly applicable for a parallelly mounted dual-tire wheel, comprising a wheel and support axle assembly, an internal-rotor hub motor, a planetary gear reducer and a brake system, wherein:

the wheel and support axle assembly comprises a tire, a rim, a spoke, a hub, an axle end cap, a hub bearing, a round nut and locking pin for the hub bearing, a wheel support axle, and an axle housing;

the internal-rotor hub motor comprises a motor housing, a stator, a winding, a rotor, a rotor support, a motor bearing, and a resolver;

the planetary gear reducer comprises a sun gear, a planetary gear, a planetary gear bearing, a planet carrier, a planetary gear pin shaft, a ring gear carrier, and a ring gear; and the brake system is a drum brake system and comprises a brake drum, a brake shoe, and a brake end cap.

2. The electric wheel assembly applicable for the parallelly mounted dual-tire wheel according to claim 1, wherein the wheel and support axle assembly are provided with two tires and two rims; the two tires are installed on the two rims, respectively; the two rims are standard rims for the parallelly mounted dual-tire wheel and are arranged symmetrically with respect to a central surface of the electric wheel assembly; the spoke and spoke installation planes of the two rims are installed together; and the spoke is connected to the hub.

3. The electric wheel assembly applicable for the parallelly mounted dual-tire wheel according to claim 1, wherein the wheel support axle is a stepped shaft, and an end thereof having a relatively small outside diameter passes through the hub; the hub bearing is arranged between the wheel support axle and the hub; the round nut and locking pin for the hub bearing is installed on the end of the wheel support axle having the relatively small outer diameter; and another end of the wheel support axle is fixed inside the axle housing.

4. The electric wheel assembly applicable for the parallelly mounted dual-tire wheel according to claim 1, wherein the axle housing is a hollow cylindrical structure, and two ends thereof are provided with flanges, respectively; and the brake end cap of the brake system is installed on the flange.

5. The electric wheel assembly applicable for the parallelly mounted dual-tire wheel according to claim 1, wherein the motor housing of the internal-rotor hub motor comprises a stator housing, an inner end cap, an outer end cap, and a rotor sleeve.

6. The electric wheel assembly applicable for the parallelly mounted dual-tire wheel according to claim 5, wherein the stator housing is a cylindrical structure; an end of the stator housing is connected together with the inner end cap and the brake end cap; and another end of the stator housing is connected together with the outer end cap and the planetary gear reducer.

7. The electric wheel assembly applicable for the parallelly mounted dual-tire wheel according to claim 5, wherein the inner end cap has a stepped cross-section gradually expanding towards the axle housing, and an outmost ring-shaped end surface of the inner end cap is provided with a mounting hole configured to connect with the stator housing and the brake end cap, and the resolver of the internal-rotor hub motor and components of the brake system are arranged in internal space of the inner end cap with the stepped cross-section.

8. The electric wheel assembly applicable for the parallelly mounted dual-tire wheel according to claim 5, wherein the stator is sleeved on an inner ring-shaped surface of the stator housing; the rotor is sleeved over the rotor support; and the rotor support is sleeved over the rotor sleeve.

9. The electric wheel assembly applicable for the parallelly mounted dual-tire wheel according to claim 5, wherein the rotor sleeve is a stepped sleeve structure; one end of the rotor sleeve away from the axle housing is provided with a gear; the brake system is installed on another end of the rotor sleeve; the motor bearings are arranged between the rotor sleeve and the inner end cap and between the rotor sleeve and the outer end cap, respectively; and the resolver is disposed at a side, proximate to the axle housing, of the motor bearing proximate to the axle housing.

10. The electric wheel assembly applicable for the parallelly mounted dual-tire wheel according to claim 5, wherein the stator housing, the inner end cap, and the brake end cap are provided with openings; three-phase wires of the internal-rotor hub motor are drawn out from a three-phase wire exit of the brake end cap; and low-voltage signal lines extend out from a signal wire exit of the brake end cap.

11. The electric wheel assembly applicable for the parallelly mounted dual-tire wheel according to claim 5, wherein a cooling manner is oil spray cooling for the internal-rotor hub motor; the stator housing is connected to a coolant inlet and a coolant outlet; a lubricating oil channel provided with a ring-shaped oil channel and an internal oil passage, an oil spray orifice, and an oil return opening are provided inside the stator housing to realize the oil spray cooling for the internal-rotor hub motor.

12. The electric wheel assembly applicable for the parallelly mounted dual-tire wheel according to claim 5, wherein another cooling manner is an integrated cooling and lubrication for the wheel and support axle assembly, the internal-rotor hub motor, and the planetary gear reducer; for the integrated cooling and lubrication, an opening is disposed in the outer end cap of the internal-rotor hub motor, so that cooling oil enters the internal-rotor hub motor through a coolant inlet, and enters the planetary gear reducer, and then passes between the planetary gear and the hub bearing, and enters inside space of the hub, then flows back to the planetary gear reducer and a bottom of the internal-rotor hub motor, and flows out from a coolant outlet at the bottom of the internal-rotor hub motor; moreover, a screen and an attraction permanent magnet are installed adjacent to the opening of the outer end cap to filter and adsorb metal wear debris.

13. The electric wheel assembly applicable for the parallelly mounted dual-tire wheel according to claim 5, wherein the planetary gear reducer is arranged between the spoke and the internal-rotor hub motor, and is installed, together with the outer end cap of the rotor hub motor, on the stator housing; and
  the sun gear of the planetary gear reducer is a power input end of the planetary gear reducer, and the planet carrier is a power output end of the planetary gear reducer.

14. The electric wheel assembly applicable for the parallelly mounted dual-tire wheel according to claim 13, wherein the planetary gear meshes with the sun gear and the ring gear; a plurality of planetary gears are provided; each planetary gear is supported on the planet carrier through the planetary gear pin shaft; the planetary gear bearing is provided between each planetary gear and the planetary gear pin shaft; an end of the planetary gear pin shaft away from the axle housing is fixed together with the planet carrier and the hub; each planetary gear has a stepped and tower-shaped gear structure, and comprises a primary gear and a secondary gear; the primary gear meshes with the sun gear; the secondary gear is arranged to be coaxial with the primary gear and meshes with the ring gear, and a number of teeth of the secondary gear is less than that of the primary gear.

15. The electric wheel assembly applicable for the parallelly mounted dual-tire wheel according to claim 14, wherein the ring gear is sleeved inside the ring gear carrier; the ring gear carrier has a stepped sleeve structure; reinforcing ribs are arranged on an outside peripheral surface of the ring gear carrier; an end of the ring gear carrier with a relatively large diameter is connected to the internal-rotor hub motor; and another end of the ring gear carrier with a relatively small diameter is fixed to a ring gear end cap.

16. The electric wheel assembly applicable for the parallelly mounted dual-tire wheel according to claim 15, wherein a reducer oil seal is arranged between the ring gear carrier and the planet carrier to achieve a sealing of the planetary gear reducer; the axle end cap is arranged on an end of the hub away from the axle housing; a hub oil seal is arranged between the wheel support axle and the rotor sleeve; the reducer oil seal, the hub oil seal, and the axle end cap jointly realize a sealing of space between the hub and the wheel support axle.

17. The electric wheel assembly applicable for the parallelly mounted dual-tire wheel according to claim 1, wherein the brake system is a cam-actuated drum brake, and comprises an actuating cam, a cam shaft, and an actuation adjusting arm, a brake chamber push rod and a brake chamber; and
  the brake shoe of the brake system is installed on the brake end cap fixed to an end of the axle housing, and air vents are disposed in the brake end cap to cool the brake system.

18. The electric wheel assembly applicable for the parallelly mounted dual-tire wheel according to claim 5, wherein the brake drum is located in space of the inner end cap and is sleeved outside an end of the rotor sleeve proximate to the axle housing, the brake drum and the rotor sleeve are connected through a spline for torque transmission, and heat-dissipation ribs are arranged on an outside peripheral surface of the brake drum.

19. An axle, comprising the electric wheel assembly according to claim 1.

20. A vehicle, comprising the axle according to claim 19.

* * * * *